United States Patent [19]

Kantor et al.

[11] Patent Number: 4,942,630
[45] Date of Patent: Jul. 24, 1990

[54] SPA WITH DOOR ACCESS FILTER AND CONTROL

[75] Inventors: Paul Kantor, Saugatuck; Loren R. Perry, Berrien Springs, both of Mich.

[73] Assignee: Conway Products Company, Kentwood, Mich.

[21] Appl. No.: 428,607

[22] Filed: Oct. 30, 1989

[51] Int. Cl.$^5$ .................................... A61H 33/02
[52] U.S. Cl. ............................... 4/542; 4/541; 4/496; 4/490; 128/66; 210/169
[58] Field of Search ............................ 4/542–544, 4/541, 488, 661, 490–492, 507, 496, 509; 210/121, 169, 238, 416.2; 222/169; 128/66

[56] References Cited

U.S. PATENT DOCUMENTS

| | | | |
|---|---|---|---|
| 2,572,463 | 10/1951 | Fine | 4/196 X |
| 4,552,658 | 11/1985 | Adcock et al. | 4/542 X |
| 4,637,873 | 1/1987 | DeSousa et al. | 4/507 |
| 4,801,378 | 1/1989 | Desjoyaux et al. | 4/507 X |

*Primary Examiner*—Henry K. Artis
*Attorney, Agent, or Firm*—Price, Heneveld, Cooper, DeWitt & Litton

[57] ABSTRACT

A whirlpool spa in which the spa filter and primary controls are mounted on an access door, which in turn is pivotally mounted along its bottom edge to the spa cabinet, whereby the primary controls and the spa filter are normally hidden from view but can readily be accessed by opening the access door.

30 Claims, 3 Drawing Sheets

SPA WITH DOOR ACCESS FILTER AND CONTROL

BACKGROUND OF THE INVENTION

The present invention relates to whirlpool spas. Such spas are typically comprised of a molded, fiber reinforced plastic (FRP) shell which is seated in a cabinet. The shell contains water which is circulated through a filter and a heater by a filter pump. Typically, a spa will use a single, two speed pump motor. The filtering and heating function is usually accomplished with the pump motor in the low speed mode.

The high speed mode of the pump motor is typically engaged when the spa is in use and the occupants desire a vigorous circulation of water through the jets within the spa. Alternatively, an optional, two pump system can be had wherein the low speed filter pump function and the high speed jet pump function are segregated into two separate pump and piping systems.

An optional air blower is often associated with the spa for injecting air bubbles into the spa. The heater, filter pump, jet pump and blower are typically located in the cabinet, generally to one side of the spa shell. A heater thermostat and an automatic timer for the filter pump are also typically located inside the cabinet. Only the on/off controls for the jet pump and the air blower, and sometimes optional spa light controls, are located on the lip of the spa shell so that they are accessible by a person using the spa. Usually, one must open a door on the side of the spa cabinet and reach into the cabinet in order to access or to service the primary controls, the heater, the filter, the pump(s) and the blower.

This is a somewhat awkward and cumbersome procedure, especially with respect to operation of the thermostat and automatic timer control, which must be accessed on a regular basis. It is also a particularly cumbersome procedure to service or maintain the filter, as one must do approximately every month.

In order to change or clean the filter element, one must first close a valve on each side of the filter to keep the water in the spa shell from draining out of the filter housing when it is opened to remove the filter element. Then, one must drain the water out of the filter housing itself. The filter housing must be opened and the filter element is then removed and either replaced or cleaned.

Because the foregoing is such an awkward procedure, some spa manufacturers provide a filter which is mounted in the top of the spa shell itself and which can be removed from the top of the spa. The cover for the filter opening is located at the top of the spa, above the water line such that the filter element sits in a normally covered well-like opening. When the cover is removed, the user pulls the filter element directly up out of the filter housing.

There are two drawbacks to this solution. First, the design of the interior shape of the spa shell is restricted since one must allow room for the filter in order to locate the filter opening in the top of the spa shell. Perhaps more significantly, dirty water and debris often drain off a filter element as it is removed from its housing. In top mounted filter systems, such dirty water and debris simply drain back into the water in the spa shell from which the debris was originally removed, recontaminating the spa water.

Yet another drawback with top mounted systems is that the spa cover must be removed in order to access the filter element. Spas are normally kept covered with an insulated cover so the water in the spa retains heat and water evaporation is minimized. Retention of chemicals in the water is also enhanced by using a spa cover. If the cover is removed or even partially removed to provide access to the filter element, one loses heat, water and chemicals when one changes or cleans the filter element.

SUMMARY OF THE INVENTION

In the spa of the present invention, the filter is mounted on a door in the spa cabinet such that when the door is opened, the filter is immediately accessible outside the spa cabinet. The operator is not required to bend over and reach into the spa cabinet in order to change or clean the filter element. Further, the filter is not located within the perimeter of the spa shell and dirty water and debris, previously filtered from the spa water, cannot drain back into the water in the spa shell, recontaminating the spa water.

Preferably, the filter is movably mounted on the door, for movement from a lower position in which the door can be closed, to an upper position wherein the filter is located above the level of the spa water. This upper position makes it unnecessary to close valves on either side of the filter and to drain the filter housing prior to opening the filter and removing the filter element for replacement or cleaning.

These and other objects, features and advantages of the invention will be more clearly understood and appreciated by reference to the written specification and appended drawings.

DESCRIPTION OF THE PREFERRED EMBODIMENT

Figure 1:
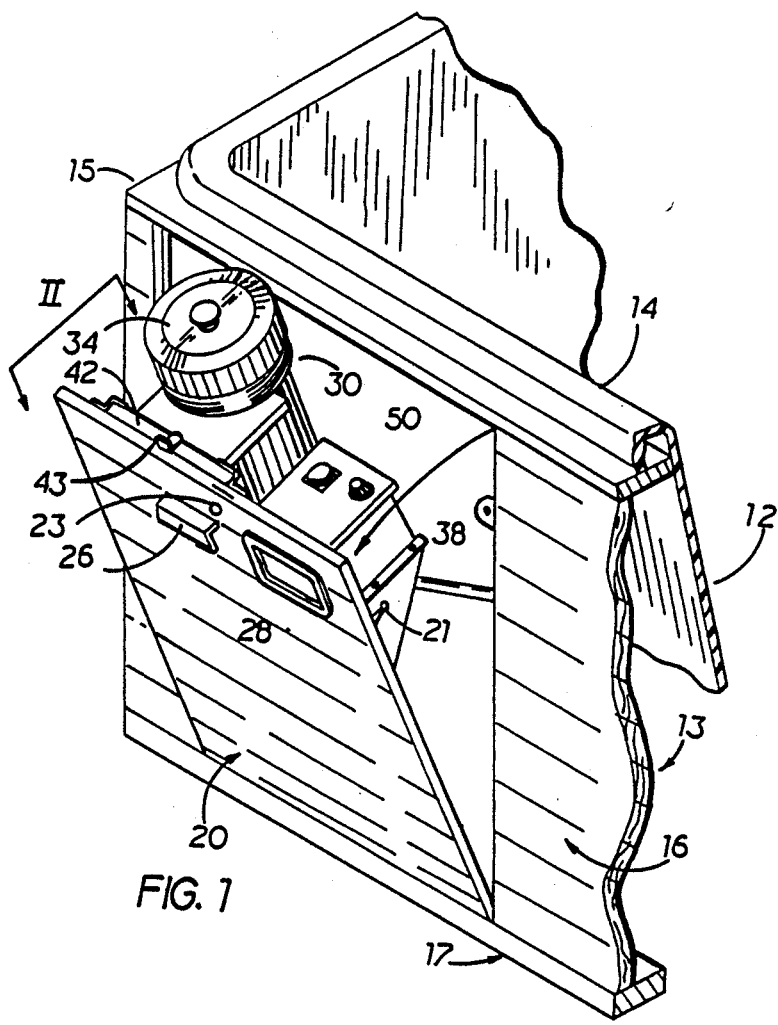
FIG. 1 is a perspective view of a portion of a spa showing the invention with the filter in the upper or service position.
Figure 2:
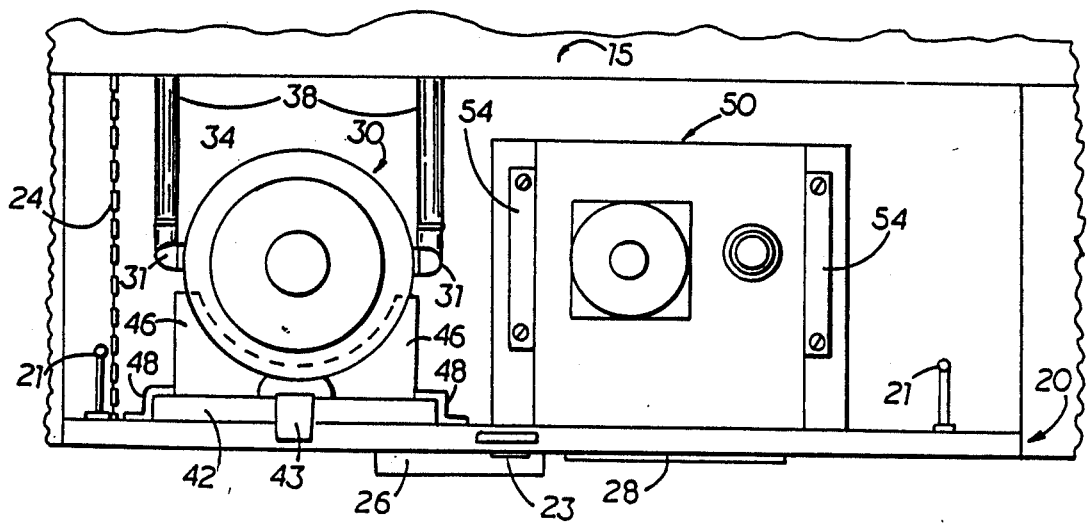
FIG. 2 is an overhead view of the invention with the access door open.

The spa of the preferred embodiment (FIG. 1) is comprised of a spa shell 12 mounted in a cabinet 13. Control box 50 is mounted on an openable access door 20 in cabinet 13. Spa filter 30 is movably mounted on access door 20 such that spa filter 30 can be slidably moved vertically. Filter 30 can slide up for easy access to the filter element (not shown) located therein when door 20 is opened.

Cabinet 13 is essentially a box with open top and bottom and which is defined by vertical panels 16, attached to each other and fixed at their top and bottom to top and bottom rails (15 and 17, respectively). Top and bottom rails (15 and 17) are basically closed rings which vary in geometry and dimension according to the spa design and application. Structural members (not shown) are added inside the cabinet space to support shell 12 and mechanical components (not shown) as required.

Shell 12 is usually molded to define various sitting areas and postures. Typically, a lip 14 will be molded into the top of shell 12. When the spa is assembled and shell 12 is inserted into the top of cabinet 13, lip 14 will rest upon upper rail 15.

Access door 20 is positioned as if a vertical panel 16 of cabinet 13, but is pivotally mounted by a hinged attachment to bottom rail 17 such that the opened door presents access from above. In use, door 20 is opened by grasping handle 26 and pulling away from the spa. The range of movement when opening door 20 is limited by stop chain 24 such that door 20 is held in an appropriate position for accessing attached filter 30 and control box 50. A pneumatic door closer (not shown) assists the operator in closing door 20 and door 20 is retained in its closed position by catches 21. Door 20 also features a window opening 28 for viewing a status indicator panel (not shown) which is associated with control box 50.

Filter 30 is a standard, top opening spa filter as used in the industry. Such filter will normally have a generally cylindrical housing 32 with service access through a screw top 34. The filter element (not shown) is contained within the housing 32 and accessed through the screw top 34. In the present invention, filter 30 is movably mounted to door 20 such that the filter can be slidably lifted into a service position when door 20 is open.

The preferred embodiment uses a slidably movable carriage 42 which is restrained to upwardly/downwardly sliding movement and affixed to door 20 by guides 48. The downwardly slidable movement of carriage 42 is arrested by stop 41. Carriage 42 and attached filter 30 are retained in the upper or service position by releasable catch 43.

Figure 6:
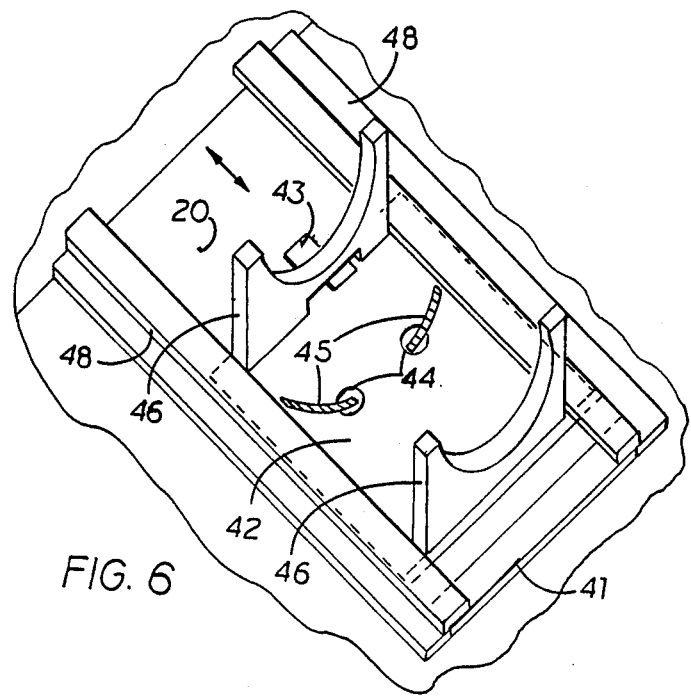
FIG. 6 is a perspective view of the filter carriage.

Referring to FIG. 6, carriage 42 has appropriate upper and lower filter mounting cradles 46 and appropriate filter mounting holes 44, through which filter mounting strap 45 passes. In assembly, filter 30 is properly positioned into cradles 46 and secured with strap 45. Carriage 42 with attached filter 30 can then be slid into the top of guides 48. Filter 30 can then be plumbed into the spa filter circuit (not shown).

Figure 3:
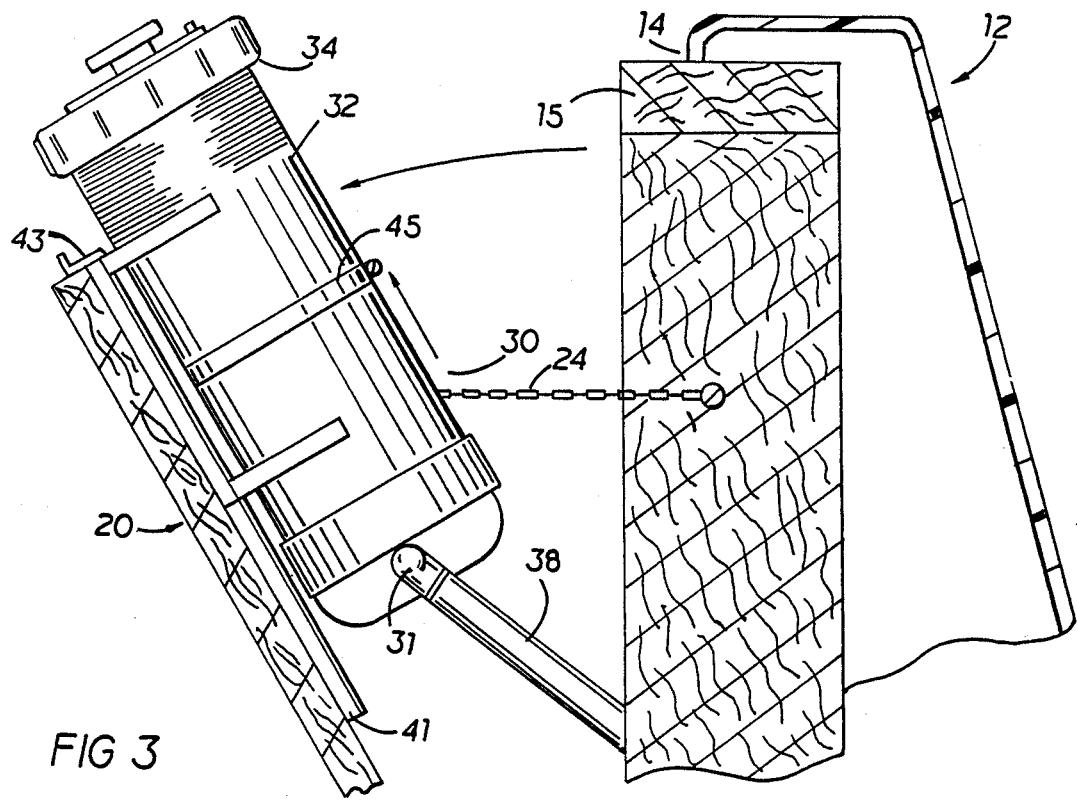
FIG. 3 is a side elevation of the invention with the access door open and showing the filter in the upper or service position.
Figure 4:
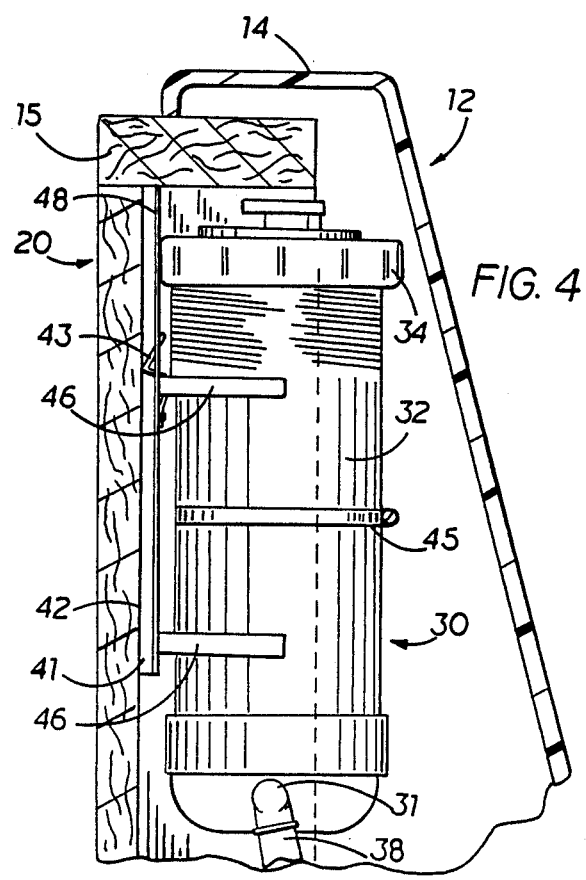
FIG. 4 is a side elevation showing the filter in the lower or normal operating position and with the access door closed.

Referring to FIGS. 3 and 4, filter 30 has ninety degree plumbing fittings 31 at the filter input and at the filter output in the preferred embodiment. There is a flexible hose 38 connected to each fitting 31. Each flexible hose 38 extends from its connection at filter 30 to its appropriate connection to the spa filter circuit (not shown) in such a manner that the movement of door 20 and the movement of filter 30 are not restricted.

Figure 5:
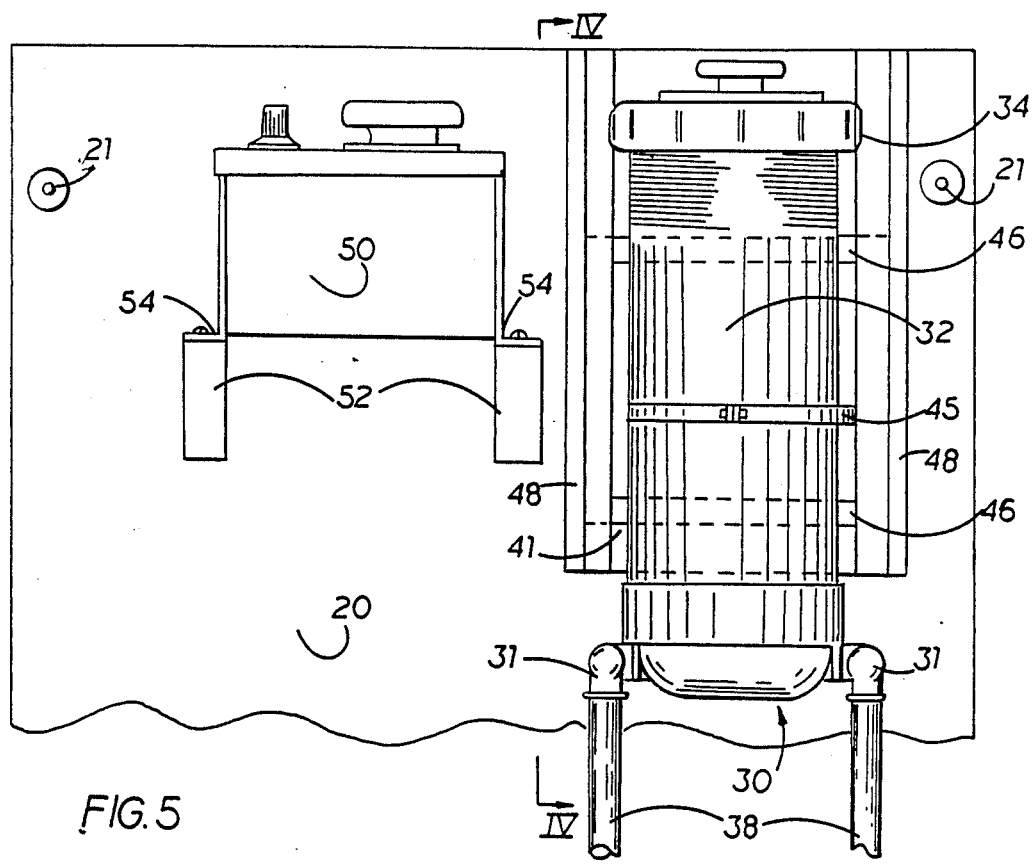
FIG. 5 is a rear elevation showing the filter in the lower or normal operating position and showing the control box, also mounted on the access door.

As indicated in FIG. 5, simple brackets 52 are attached to door 20. Control box 50 is mounted upon brackets 52 as shown or can be mounted into a shelf (not shown) which is mounted upon brackets 52 in what might typically be referred to as a "panel mount" configuration. Control box 50 has mounting flanges 54 so it can be mounted directly upon brackets 52 in the preferred embodiment.

An indicator panel (not shown), which indicates the functional status of the spa, is associated with control box 50. A windowed opening 28 is located in door 10 so as to provide an unobstructed view of the indicator panel (not shown). Thus, the functional status of the spa can be monitored merely by looking at the indicator panel through window 28.

In use, door 20 is normally closed, concealing filter 30 and control box 50 (FIG. 4). Door 20 can be locked closed by a lock 23 to enhance safety and reduce tampering. To access the primary controls (thermostat, cycle timing, etc.) of control box 50 or to access filter 30, one would grasp handle 26 on door 20 and pull away from the spa, pivoting door 20 about its hinged attachment to bottom cabinet rail 17 and revealing filter 30 and control box 50 (FIGS. 1 and 3). The primary controls of control box 50 are openly displayed for manipulation and filter 30 is readily accessed for service.

Servicing filter 30 is accomplished by sliding it upwardly until catch 43 is engaged and filter 30 is held in its upper or service position. Screw top 34 is now above the spa water level and can be removed without any further procedure and without concern of spillage or drainage of spa water. After screw top 34 is removed, the filter element (not shown) is revealed and may be removed for cleaning or replacement. As filter 30 is outside the perimeter of spa shell 12 at this point, any drainage off the filter element will not drain into the water within spa shell 12. After the filter element is cleaned or replaced, screw top 34 is reinstalled, catch 43 is released and filter 30 is slid down to its lower or normal position against lower stop 41 and door 20 is closed to its normal position. Door 20 is closed by merely pushing upon its face toward the spa, thus pivoting it about its hinged attachment at bottom rail 17, until closure catches 21 are engaged and door 20 is held in its closed position.

Access door 20 may be sized and constructed so as to accommodate only filter 30. Access door 20 may be sized and constructed so as to accommodate filter 30 and primary control box 50 as generally described above and shown in the Figures. Or, separate access doors may be sized and constructed so as to accommodate filter 30 and control box 50 individually.

The above description is considered that of the preferred embodiment only. Modifications of the invention will occur to those who make or use the invention. Therefore, it is understood that the embodiment shown in the drawings and described above is merely for illustrative purposes and is not intended to limit the scope of the invention, which is defined by the following claims.

The embodiment of the invention in which an exclusive property or privilege are claimed is defined as follows.

1. A whirlpool spa comprising:
  a cabinet;
  a reservoir for containing water, mounted in said cabinet;
  an opening in said cabinet to facilitate access to the interior thereof;
  an access door;
  means mounting said access door on said cabinet over said cabinet opening such that said access door can be moved between an open position allowing access through said cabinet opening and a closed position for preventing access through said cabinet opening;
  said access door having an outside surface which is exposed to the exterior of said cabinet when said door is closed and an inside surface which is exposed to the exterior of said cabinet only when said access door is opened;
  a spa filter in flow communication with said reservoir;

means for pumping water from said reservoir through said spa filter;

said spa filter being mounted on said inside surface of said access door whereby when said access door is moved to its open position, said spa filter is accessible from the exterior of said cabinet.

2. The whirlpool spa of claim 1 in which said filter is mounted on said door by first and second cooperating means on said filter and said door, respectively, said first cooperating means and said second cooperating means being movable relative to one another in a generally vertical direction whereby said filter can be moved into an elevated position upon said door when said door is opened, and can be moved to a lowered position to facilitate closing said access door.

3. The whirlpool spa of claim 2 in which said first cooperating means comprises a carriage and said second cooperating means comprises a track, said carriage being slidably mounted in said track.

4. The whirlpool spa of claim 3 in which said track includes a bottom stop which is engaged by said carriage when said filter is in its lowered position.

5. The whirlpool spa of claim 4 in which said carriage includes a biased latch and said door includes a catch, said latch being biased toward engagement with said catch when said latch and catch are aligned, said catch being located on said door such that said latch is not aligned with said catch until said filter is elevated into its elevated position; said latch being movable out of engagement with said catch whereby said filter can be lowered when desired.

6. The whirlpool spa of claim 2 in which said access door includes a bottom edge and a top edge; said means mounting said access door to said cabinet comprising pivotal mounting means located adjacent said bottom edge whereby when said door is opened, said top edge pivots outwardly away from said cabinet.

7. The whirlpool spa of claim 6 in which restraint means are connected between said cabinet and said access door to restrain the extent to which said door can be pivoted into its open position; said restraint means allowing sufficient pivotal movement outwardly that said filter mounted on said access door can be readily and conveniently accessed.

8. The whirlpool spa of claim 7 in which said door includes a latch and said cabinet includes a catch, said door latch engaging said cabinet catch when said door is moved into its closed position.

9. The whirlpool spa of claim 6 in which said spa filter comprises a housing having an open top which is normally closed by a removable top cover, and a filter element located within said housing and being removable therefrom through said open top when said top cover is removed from said housing.

10. The whirlpool spa of claim 9 in which said filter is in flow communication with said reservoir and said pump means through flexible conduit, said conduit being sufficiently long and flexible that it does not interfere with said access door being opened or said filter being moved upwardly to said elevated position on said door.

11. The whirlpool spa of claim 10 in which said filter includes an input and an output; said flexible conduit being operably connected to said input of said filter through a first ninety degree elbow fitting and being connected to said output of said filter through a second ninety degree elbow fitting.

12. The whirlpool spa of claim 10 which includes a heater, a thermostat for controlling said heater and a timer for controlling said pump means; said thermostat and said timer being located in a control box; said control box being mounted on said access door whereby said thermostat and said timer are readily accessible to the exterior of said spa when said access door is opened, but are hidden from view when said access door is closed.

13. The whirlpool spa of claim 12 in which said control box includes indicator means for indicating the status of said thermostat and said pump means; said access door including a window therein, said indicator means being located in said window such that said indicator means can always be viewed from the exterior of said cabinet.

14. The whirlpool spa of claim 1 in which said access door includes a bottom edge and a top edge; said means mounting said access door to said cabinet comprising pivotal mounting means located adjacent said bottom edge whereby when said door is opened, said top edge pivots outwardly away from said cabinet.

15. The whirlpool spa of claim 14 in which said spa filter comprises a housing having an open top which is normally closed by a removable top cover, and a filter element located within said housing and being removable therefrom through said open top when said top cover is removed from said housing.

16. The whirlpool spa of claim 15 in which said filter is in flow communication with said reservoir and said pump means through flexible conduit, said conduit being sufficiently long and flexible that it does not interfere with said access door being opened or said filter being moved upwardly to said elevated position on said door.

17. The whirlpool spa of claim 1 in which said spa filter comprises a housing having an open top which is normally closed by a removable top cover, and a filter element located within said housing and being removable therefrom through said open top when said top cover is removed from said housing.

18. The whirlpool spa of claim 17 in which said filter is in flow communication with said reservoir and said pump means through flexible conduit, said conduit being sufficiently long and flexible that it does not interfere with said access door being opened or said filter being moved upwardly to said elevated position on said door.

19. The whirlpool spa of claim 1 which includes a heater, a thermostat for controlling said heater and a timer for controlling said pump means; said thermostat and said timer being located in a control box; said control box being mounted on said access door whereby said thermostat and said timer are readily accessible to the exterior of said spa when said access door is opened, but are hidden from view when said access door is closed.

20. The whirlpool spa of claim 19 in which said control box includes indicator means for indicating the status of said thermostat and said pump means; said access door including a window therein, said indicator means being located in said window such that said indicator means can always be viewed from the exterior of said cabinet.

21. A whirlpool spa comprising:
a cabinet;
a reservoir for containing water, mounted in said cabinet;

an opening in said cabinet to facilitate access to the interior thereof;

spa equipment including at least one of a water purifying means in flow communication with said reservoir, means for pumping water from said reservoir through said water purifying means, a heater for heating said water, means whereby air bubbles are injected into said water, heater for heating said air bubbles, and control means for controlling any of said purifying means, pumping means, blower means and heaters;

support means adjacent said opening for supporting said spa equipment such that said spa equipment is located within said cabinet;

said spa equipment being mounted on said support means;

said support means being movably mounted relative to said cabinet such that said support means can be moved between a closed position with said spa equipment located inside said cabinet for preventing access and an open position exteriorly of said cabinet whereby said spa equipment is accessible from the exterior of said cabinet.

22. The whirlpool spa of claim 21 in which restraint means are connected between said cabinet and said support means to restrain the extent to which said support means can be moved relative to said cabinet;

said restraint means allowing sufficient movement of said support means that said spa equipment mounted on said support means can be readily and conveniently accessed from the exterior of said cabinet when said support means is in said open position and that said spa equipment mounted on said support means is completely contained within the perimeter of said cabinet when said support means is in said closed position.

23. The whirlpool spa of claim 22 in which a latch is mounted in cooperation with said support means and a catch is mounted in cooperation with said cabinet, said latch engaging said catch when said support means is moved into said closed position.

24. The whirlpool spa of claim 23 in which said spa equipment is operatively connected in cooperation with said spa through flexible conduit, said conduit being sufficiently long and flexible that it does not interfere with said support means moving to said opened position and that it does not interfere with said support means being moved to said closed position.

25. The whirlpool spa of claim 24 which includes an access door which covers said cabinet opening and is mounted in cooperation with said support means such that said access door covers said cabinet opening for preventing access to said spa equipment when said support means is in said closed position and said access door allows ready and convenient access to said spa equipment from the exterior of said spa when said support means is in said open position.

26. The whirlpool spa of claim 25 in which said spa equipment includes indicator means for indicating the status of said spa equipment, said access door including a window therein and said interior means being located in said window such that said indicator means can always be viewed from the exterior of said cabinet.

27. The whirlpool spa of claim 21 in which said spa equipment is operatively connected in cooperation with said spa through flexible conduit, said conduit being sufficiently long and flexible that it does not interfere with said support means moving to said opened position and that it does not interfere with said support means being moved to said closed position.

28. The whirlpool spa of claim 27 which includes an access door which covers said cabinet opening and is mounted in cooperation with said support means such that said access door covers said cabinet opening for preventing access to said spa equipment when said support means is in said closed position and said access door allows ready and convenient access to said spa equipment from the exterior of said spa when said support means is in said open position.

29. The whirlpool spa of claim 28 in which said spa equipment includes indicator means for indicating the status of said spa equipment, said access door including a window therein and said indicator means being located in said window such that said indicator means can always be viewed from the exterior of said cabinet.

30. The whirlpool spa of claim 21 in which said spa equipment is operatively connected in cooperation with said spa through flexible conduit, said conduit being sufficiently long and flexible that it does not interfere with said support means moving to said opened position and that it does not interfere with said support means being moved to said closed position.

* * * * *

UNITED STATES PATENT AND TRADEMARK OFFICE
CERTIFICATE OF CORRECTION

PATENT NO. : 4,942,630

DATED : July 24, 1990

INVENTOR(S) : Paul Kantor and Loren R. Perry

It is certified that error appears in the above-identified patent and that said Letters Patent is hereby corrected as shown below:

Column 2, line 56:
   "moVably" should read --movably--;

Column 8, line 15:
   "interior" should read --indicator--.

Signed and Sealed this

Seventh Day of January, 1992

Attest:

HARRY F. MANBECK, JR.

*Attesting Officer*     *Commissioner of Patents and Trademarks*